Figure 1:
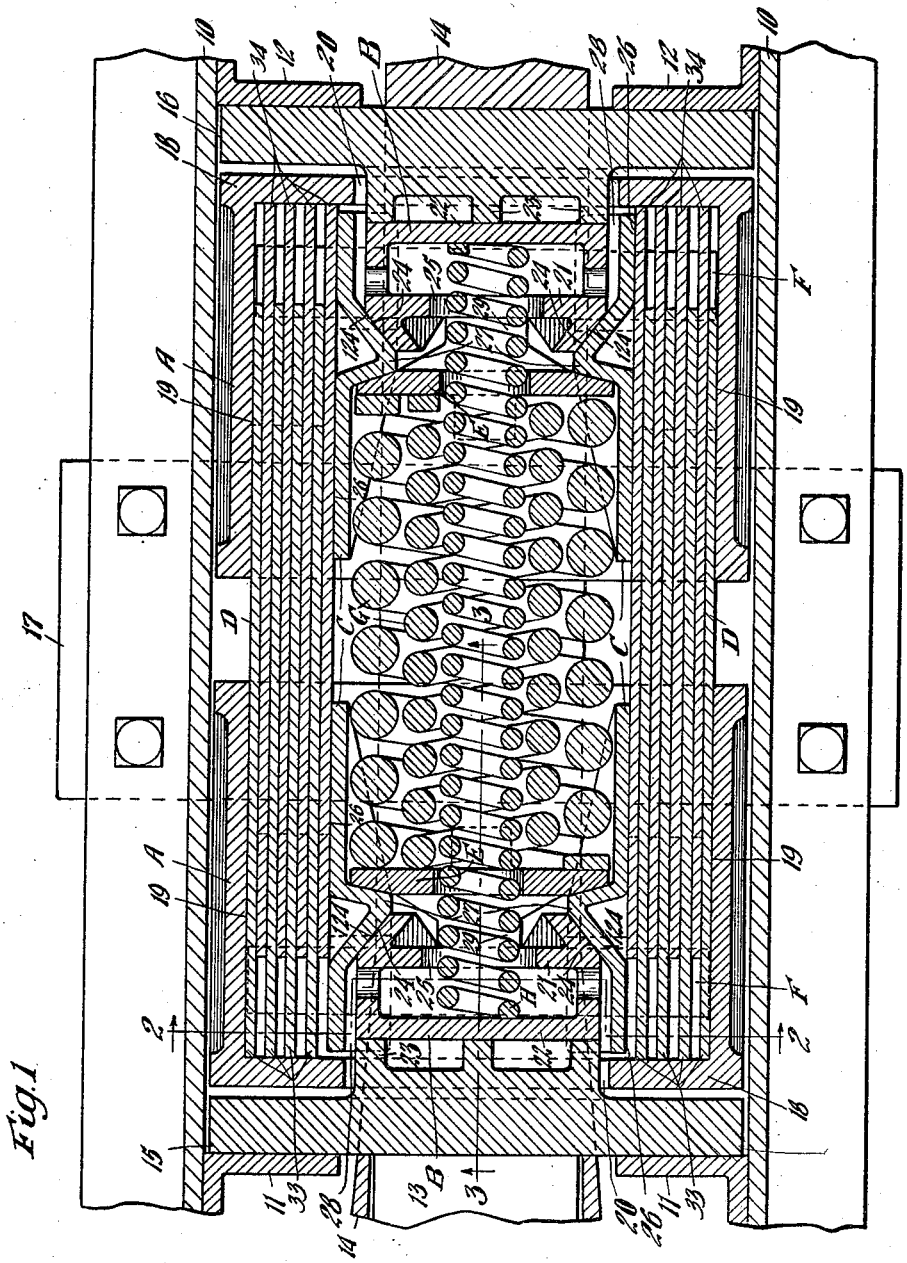

May 29, 1928.

S. B. HASELTINE 1,671,582

FRICTION SHOCK ABSORBING MECHANISM

Filed Aug. 4, 1924

2 Sheets-Sheet 1

Witnesses
Wm. Geiger

Inventor
Stacy B. Haseltine
By George I Haight
His Atty.

May 29, 1928.
S. B. HASELTINE
1,671,582
FRICTION SHOCK ABSORBING MECHANISM
Filed Aug. 4, 1924
2 Sheets-Sheet 2
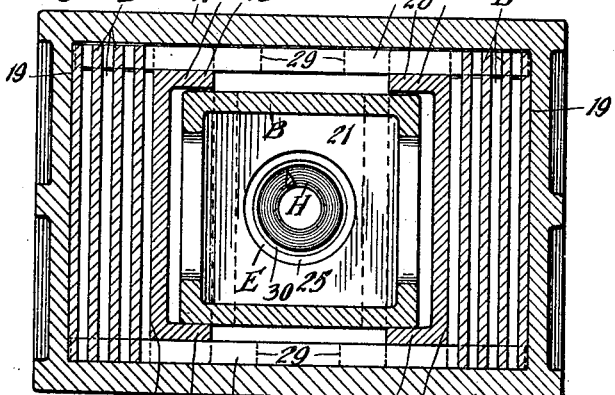
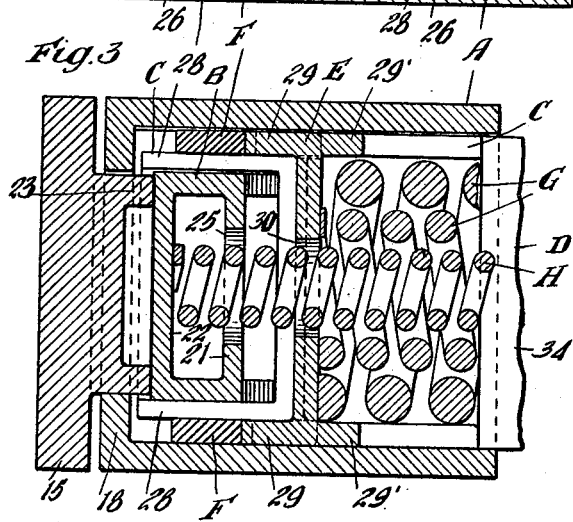
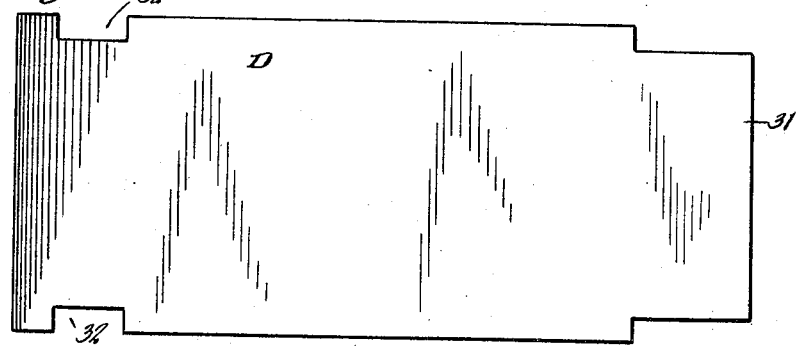
Witnesses
Wm. Geiger
Inventor
Stacy B Haseltine
By George I Haight
His Atty.

Patented May 29, 1928.

1,671,582

UNITED STATES PATENT OFFICE.

STACY B. HASELTINE, OF CHICAGO, ILLINIOS, ASSIGNOR, BY MESNE ASSIGNMENTS, TO W. H. MINER, INC., A CORPORATION OF DELAWARE.

FRICTION SHOCK-ABSORBING MECHANISM.

Application filed August 4, 1924. Serial No. 729,876.

This invention relates to improvements in friction shock absorbing mechanisms.

One object of the invention is to provide a friction shock absorbing mechanism of the intercalated plate type, more particularly adapted for railway draft riggings, wherein is obtained high capacity due to large frictional areas, together with light preliminary action during the compression stroke and certain and immediate release of the mechanism upon reduction of the actuating force.

A more specific object of the invention is to provide a shock absorbing mechanism of the character indicated, including a plurality of relatively movable friction plates and a wedge means for placing the plates under lateral pressure, wherein the wedge means is entirely free to release, independently of the other parts of the mechanism, thereby preventing the sticking of the wedge means and assuring the immediate reduction of pressure on the parts of the mechanism at the initiation of the releasing action after each actuation of the mechanism, to insure a quick and easy restoration of all of the parts to normal position.

Other objects and advantages of the invention will more clearly and fully appear from the description and claims hereinafter following.

In the drawings, forming a part of this specification, Figure 1 is a horizontal, longitudinal, sectional view of a portion of a railway draft rigging, showing my improvements in connection therewith. Figure 2 is a vertical, transverse, sectional view corresponding substantially to the line 2—2 of Figure 1. Figure 3 is a vertical, longitudinal, sectional view of the forward portion of the shock absorbing mechanism proper, corresponding substantially to the line 3—3 of Figure 1. Figure 4 is a detailed, side, elevational view of one of the friction plates used in connection with my improved mechanism, and Figure 5 is a detailed, perspective view of one of the friction wedge shoes.

In said drawings, 10—10 indicate channel-shaped, center or draft sills, of a railway car underframe to the inner faces of which are secured front stop lugs 11—11 and rear stop lugs 12—12. A portion of the drawbar is shown at 13, to which is suitably attached a hooded yoke 14 of well-known form. The shock absorbing mechanism proper and the front and rear followers 15 and 16 are disposed within the yoke. The yoke and the parts therewithin are supported in operative position by a detachable saddle plate 17.

The improved shock absorbing mechanism, as shown, comprises broadly front and rear casings A—A; front and rear wedge blocks B—B; front and rear pairs of wedge friction shoes C—C; two groups of intercalated friction plates D—D; front and rear spring followers E—E; front and rear sets of plate restoring bars F—F; a main spring resistance G; and an auxiliary spring resistance H.

The front and rear casings A are of like design, each being of rectangular box-like form having a vertical end wall 18 at one end and open at the opposite end. The inner sides of the opposite side walls of each casing present longitudinally extending friction surfaces 19. An opening 20 of rectangular outline is formed in the end wall 18 of each casing, the top, bottom and side edges of said opening being spaced from the top, bottom and sides of the corresponding casing, as clearly shown in Figures 1 and 3, thereby providing an interior abutment surface and reinforcing flange entirely surrounding said opening.

The front and rear wedges B, which are of like construction also, are in the form of hollow blocks. Each block B has parallel, spaced, transversely disposed, inner and outer vertical end walls, 21 and 22, connected by top, bottom and side walls. The end wall 22 of each block presents a flat face adapted to bear on a boss 23 inwardly projecting from the corresponding main follower. The boss 23 of each of the followers 15 and 16 is of rectangular outline corresponding in size to the end face of the corresponding wedge block, and as illustrated, comprises spaced top, bottom and side ribs and a vertically disposed rib midway between the side ribs, connecting the top and bottom ribs. As clearly shown in Figures 1 and 3, the boss 23 of each main follower extends through and works freely in the opening 20 of the end wall of the corresponding casing A. Each block B has the side walls thereof extended inwardly beyond the wall 22, said side walls converging toward the longitudinal axis of the mechanism and presenting a pair of flat wedge faces 24 at opposite sides of the wedge block, adapted to coact with the adjacent pair of friction shoes C. The inner end wall 21 of each block B is provided with a relatively large opening 25 adapted to freely accommodate the corresponding end of the auxiliary spring resistance H, the latter being interposed between the front and rear wedge blocks B and having its front and rear ends bearing on the respective end walls 22 of the front and rear wedges.

The friction shoes C are four in number, arranged in pairs at opposite ends of the mechanism, each pair coacting with a corresponding wedge block B. Each shoe C has a flat outer face 26 adapted to coact with the corresponding group of friction plates D. On the inner side, or the side nearest the axis of the mechanism, each shoe is provided with a lateral enlargement 27, disposed between the ends of the shoe, said enlargement having an outer wedge face 124 adapted to coact with one of the wedge faces 24 of the corresponding wedge B. Each shoe is cut away at the outer end at the top and bottom as clearly shown in Figure 5, to provide clearance for the corresponding restoring bars F and on the side nearest the axis of the mechanism is provided with top and bottom, horizontally disposed flanges 28 adapted to embrace and form guides and supports for the corresponding wedge block B. Each shoe also has top and bottom reinforcing flanges on the inner side of the shoe between the enlargement 27 and the inner end of said shoe.

The front and rear spring followers E are of identical construction, each being in the form of a heavy, rectangular plate. Each plate E is disposed transversely of the mechanism and has the opposite ends thereof beveled and engaging the inner sides of the enlargement 27 of the corresponding shoes, the inner sides of said enlargements being correspondingly beveled as clearly shown in Figure 1. The plates E are provided with top and bottom, horizontally disposed flanges or arms 29 and horizontally disposed top and bottom lugs 29', the arms 29 of each plate extending outwardly above and below the corresponding wedge and having their free ends abutting the corresponding restoring bars. The lugs 29' project inwardly and serve to center the corresponding end of the spring G. The plate portion proper of each spring follower is provided with a central opening 30 through which the spring H extends, the openings 30 of the followers being axially alined with the openings of the wedges B and being of such a size as to freely accommodate the spring H.

The spring resistance G comprises an inner light coil surrounding the coil H and an outer, relatively heavier coil, the coils of the spring resistance G being disposed longitudinally of the mechanism between the front and rear sets of shoes and having their opposite ends bearing respectively on the front and rear spring followers E.

The friction plates or elements D are arranged within the casings A and comprise two oppositely disposed groups, each group being preferably composed of eight plates. All of the friction elements or plates D of both groups are of identical construction. Upon reference to Figure 4, it will be seen that each plate D has the upper and lower edges cut away at one end thereof to provide a reduced end section 31. Near the opposite end, each plate has the upper and lower edges notched as indicated at 32—32, the notches being in vertical alignment. The plates of each group are arranged in two sets, one set consisting of four plates 33—33 and the other set consisting of four plates 34—34, the plates 33 composing one set are alternated with the plates 34 of the other set and are reversely arranged thereto, so that the plates 33 have the ends provided with the recesses 32 at the forward end of the mechanism and the plates 34 have the ends provided with the recesses 32 disposed at the rear end of the mechanism. The plates composing each group are interposed between the set of front and rear shoes C at the corresponding side of the mechanism, and the adjacent side walls of the front and rear casings A, one of the plates 33 of each group being disposed outermost and engaging the respective casing friction surfaces 19 and a plate 34 of each group being disposed innermost and engaging the friction surfaces 26 of the corresponding shoes C.

The bars F are four in number, two being disposed at each end of the mechanism, one above and the other below the corresponding wedge block B. Each bar F is arranged transversely of the mechanism, and is adapted to abut the corresponding arm 29 of one of the spring followers E. The top and bottom bars at each end of the mechanism extend laterally beyond the corresponding shoes at opposite sides of the mechanism. The opposite ends of the top and bottom bars at the forward end of the mechanism engage with the corresponding notches 32 of the respective sets of plates 33 at the opposite sides of the mechanism, and the top and bottom bars at the rear end of the mechanism engage with the respective notches 32 of the two sets of plates 34. The notches of each plate are of such a size as to substantially fit the coacting bars F so that the plates will move in unison with the corresponding bars.

In the normal full released position of the mechanism, which is most clearly shown in Figures 1 and 3, the front ends of the plates 33 and the rear ends of the plates 34 of each group are respectively held in their outermost position by the front and rear sets of bars F, the respective sets of front and rear bars being held in their outermost position by the arms 29 of the corresponding spring follower E, outward movement of the latter being limited by engagement with the corresponding shoes C. The front ends of the plates 33 are held in abutment with the end wall of the front casing A and the rear ends of the plates 34 are held in abutment with the inner surface of the end wall of the rear casing C. The respective plates are of such a length that the rear ends of the plates 33 and the front ends of the plates 34 are normally spaced a sufficient distance from the corresponding end walls of the rear and front casings to permit the required full movement of the plates during the compression stroke, the reduced ends 31 working between the corresponding bars and being of such an extent as to insure proper clearance. The front and rear casings A are normally spaced a slight distance inward from the corresponding followers, being held in that position by the plates D, which are adapted to bear on the inner surfaces of the end walls 18 of the plates as hereinbefore pointed out. The shoes C are yieldingly maintained in their outermost position by the main spring G acting through the spring followers E, outward movement of the shoes being in turn limited by engagement with the wedges B, and outward movement of the latter being limited by the front and rear followers.

The operation of my improved shock absorbing mechanism is as follows, assuming an inward or buffing movement of the drawbar; upon inward or rearward movement of the drawbar, the front follower 15 will be moved therewith, forcing the front wedge B and the shoes C rearwardly therewith and compressing the main spring resistance G between the spring followers, thereby forcing the rear pair of shoes against the rear wedge B. At the same time, the spring resistance H will be compressed directly between the wedges B. A wedging action will thus be set up between each wedge and the corresponding set of shoes, placing the friction plates under lateral pressure. As rearward movement of the front follower continues, the friction shoes C will tend to move the friction plates and front casing A rearwardly therewith, due to the friction between the shoes C and the two groups of plates and between the latter and the front casing A. There will be a subtsantially equal resistance to the rearward movement of the plates and the rear casing A, due to the friction between the rear shoes, plates and casing. This will result in a balancing action, and the rear casing A will approach the rear follower 16 at substantially the same rate as the front follower approaches the front casing, while the front shoes slip on the inner plates 34 and the latter slip on the rear shoes C. A comparatively light, initial, frictional resistance is thus had during the operation just described. This action continues until the front follower engages the front casing A and the rear casing engages the rear follower, whereupon the front casing A will be moved rearwardly directly by the front follower while the rear casing will be held stationary by contact with the rear follower, and the plates 33 and 34 will be moved relatively to each other, greatly augmenting the frictional resistance. The relative movement of the casings A will be arrested upon the adjacent inner ends thereof coming into engagement, whereupon the forces will be transmitted directly to the rear stop lugs. As will be evident, during the initial relative movement of the main follower and the casings, the arms of the spring followers will be moved away from the corresponding bars F, thus spacing the arms inwardly of the bars an appreciable distance.

During draft, the action is the reverse of that described, the rear follower 16 being moved forwardly while the front follower 15 is held stationary.

Upon removal of the actuating force, the wedging pressure will be immediately relieved, due to the expansive action of the spring H, forcing the wedges B outwardly, the wedges being free to move independently of the other elements of the mechanism at this time. There will also be an initial easy release movement of the friction shoes C due to the bars F being spaced from the outer ends of the arms of the spring follower E. This initial action assures an easy release and certain reduction of the lateral pressure on the groups of plates. As the spring followers and shoes at the front end of the mechanism move outwardly relatively to the casing A, due to the action of the main spring resistance G, the outer ends of the arms of the spring followers will be brought into engagement with the corresponding set of bars F and the bars in turn will be moved outwardly, also effecting outward movement of the plates 33 which are anchored thereto, thereby causing the front casing A to be carried outwardly also. Simultaneously with the outward movement of the wedge and coacting shoes at the front end of the mechanism, the spring resistance elements are permitted to expand, thereby relieving the pressure on the shoes C at the rear end of the mechanism and reducing the pressure on the plates. As the two sets of plates 33 move forwardly with the front casing, the other two sets of plates 34 and the rear casing A, due to the friction between the parts will be carried along therewith until arrested by the bars F anchored to the plates 34 coming into engagement with the arms of the rear spring follower E. All of the parts will thus be restored to normal position by the expansion of the spring resistance elements G and H.

As wear occurs on the various friction wedge surfaces, compensation therefor will be had by the wedge shoes C being moved apart due to the expansion of the spring resistance G, which is under initial compression, a sufficient clearance being left between the outer end of each shoe and the end wall of the corresponding casing to permit the required outward movement of the wedge shoes.

From the preceding description, it will be evident that I have provided an intercalated plate gear of exceedingly high capacity in which absolute release of the main wedges is assured by means entirely independent of the usual main spring resistance for restoring the friction shoes and plates to normal position, the main wedge being freed from the shoes by independent spring means directly coacting with the same, and being further entirely free from engagement with the elements for restoring the other parts of the mechanism. It will also be evident that release is further facilitated by the main spring resistance moving the shoes relatively to the friction plates to break the frictional contact therebetween before any restoring movement of the plates is effected.

I have herein shown and described what I now consider to be the preferred manner of carrying out the invention, but the same is merely illustrative and I contemplate all changes and modifications that come within the scope of the claims appended hereto.

I claim:

1. In a friction shock absorbing mechanism, the combination with front and rear followers relatively movable toward and from each other; of front and rear friction casings also relatively movable toward and from each other, said casings each having an outer end wall and each casing also having interior, opposite, longitudinally disposed, friction surfaces; a plurality of relatively movable friction elements within said casings, said elements being divided into two groups disposed on opposite sides of the mechanism, each group coacting with friction surfaces at one side of said casings, alternate friction elements of each group being engaged by the end walls of one of said casings and the remaining friction elements of said groups being engaged by the end wall of the other casing, whereby said friction elements are moved relatively to each other upon relative movement of said casings toward each other; a lateral wedge pressure creating system at each end of the mechanism disposed between said groups of friction elements, each system including a wedge pressure transmitting element and a plurality of wedge friction shoes, said wedge pressure transmitting elements being directly engaged by the front and rear followers respectively; and a spring resistance interposed between said wedge pressure creating system.

2. In a friction shock absorbing mechanism, the combination with front and rear follower acting members relatively movable toward and from each other; front and rear wedge members associated respectively with said followers; front and rear pairs of wedge friction shoes coacting with said wedge members; front and rear friction casings relatively movable toward and from each other, each of said casings having its outer end closed by a transverse wall, said wall being provided with an opening to freely receive the corresponding wedge member for working movement therein, said casings also having interior, opposite, longitudinally disposed friction surfaces; a plurality of relatively movable friction elements within said casings, certain of said elements having engagement with the transverse wall of one of said casings and the remaining elements having engagement with the transverse wall of the other casing, said elements being divided into two groups at opposite sides of the mechanism, each of said groups coacting with the friction surfaces at one side of said casings and corresponding friction wedge shoes; and main spring resistance means interposed between said front and rear wedges and wedge shoes.

In witness that I claim the foregoing I have hereunto subscribed my name this 2nd day of August, 1924.

STACY B. HASELTINE.